US010961818B2

(12) United States Patent
Inglis et al.

(10) Patent No.: US 10,961,818 B2
(45) Date of Patent: Mar. 30, 2021

(54) BALL VALVE WITH DISSOLVABLE BALL

(71) Applicant: Halliburton Energy Services, Inc., Houston, TX (US)

(72) Inventors: Peter D W Inglis, Dundee Tayside (GB); Katherine Ann Davies, Reflections (SG)

(73) Assignee: Halliburton Energy Services, Inc., Houston, TX (US)

( * ) Notice: Subject to any disclaimer, the term of this patent is extended or adjusted under 35 U.S.C. 154(b) by 47 days.

(21) Appl. No.: 16/327,281

(22) PCT Filed: Sep. 21, 2016

(86) PCT No.: PCT/US2016/052831
§ 371 (c)(1),
(2) Date: Feb. 21, 2019

(87) PCT Pub. No.: WO2018/056966
PCT Pub. Date: Mar. 29, 2018

(65) Prior Publication Data
US 2019/0218883 A1 Jul. 18, 2019

(51) Int. Cl.
*E21B 34/06* (2006.01)
*F16K 5/06* (2006.01)
*F16K 5/08* (2006.01)
*F16K 27/06* (2006.01)

(52) U.S. Cl.
CPC ............ *E21B 34/063* (2013.01); *E21B 34/06* (2013.01); *F16K 5/06* (2013.01); *F16K 5/0605* (2013.01); *F16K 5/08* (2013.01); *F16K 27/067* (2013.01); *E21B 2200/04* (2020.05)

(58) Field of Classification Search
CPC .... E21B 34/06; E21B 34/063; E21B 2200/04; F16K 5/06; F16K 5/0605; F16K 5/08; F16K 27/067
See application file for complete search history.

(56) References Cited

U.S. PATENT DOCUMENTS

| 3,814,182 | A | * | 6/1974 | Giroux | E21B 34/125 |
| | | | | | 166/331 |
| 4,610,308 | A | * | 9/1986 | Meek | E21B 49/088 |
| | | | | | 166/321 |
| 5,836,395 | A | | 11/1998 | Budde | |
| 7,168,494 | B2 | | 1/2007 | Starr et al. | |
| 2009/0242199 | A1 | * | 10/2009 | Basmajian | E21B 34/14 |
| | | | | | 166/255.2 |

(Continued)

FOREIGN PATENT DOCUMENTS

WO       2016014075 A1     1/2016

OTHER PUBLICATIONS

International Search Report and Written Opinion dated May 31, 2017, for the PCT application PCT/US2016/052831 filed on Sep. 21, 2016.

*Primary Examiner* — D. Andrews
(74) *Attorney, Agent, or Firm* — Chamberlain Hrdlicka

(57) ABSTRACT

A ball valve can include a housing that contains a flow path and a ball positioned in the flow path. The ball can be configured to seal a first portion of the flow path from a second portion of the flow path in a closed position, and at least a portion of the ball can be dissolvable and the ball can include a bore formed therethrough.

12 Claims, 3 Drawing Sheets

(56) References Cited

U.S. PATENT DOCUMENTS

| | | | |
|---|---|---|---|
| 2012/0260991 A1* | 10/2012 | Inglis | F16K 17/40 137/1 |
| 2013/0048304 A1 | 2/2013 | Argawal et al. | |
| 2013/0206417 A1 | 8/2013 | Kalb et al. | |
| 2015/0315870 A1 | 11/2015 | Kalb et al. | |
| 2016/0166897 A1* | 6/2016 | Roach, II | A63B 57/50 473/386 |

* cited by examiner

BALL VALVE WITH DISSOLVABLE BALL

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Wellbores are sometimes drilled into subterranean formations containing hydrocarbons to allow recovery of the hydrocarbons. During the drilling and production of a hydrocarbon bearing formation, various procedures may be performed that involve temporarily isolating fluid flowing between the surface of a wellbore and the formation through a wellbore tubular. Such procedures can include flow control operations, completion operations, and/or interventions. Various valves, including ball valves, may be used during these procedures to control the flow of fluid through the wellbore tubular. Ball valves generally include a ball seat for receiving a sealing ball. In some situations, ball valves may fail during use, which may reduce the ability to establish fluid communication between the surface of the wellbore and the formation through the wellbore tubular. In some instances, should the ball become stuck in a closed position, the only way to gain access to the reservoir below the ball is to mill the ball, which is often a time and resource consuming operation.

BRIEF DESCRIPTION OF THE DRAWINGS

For a detailed description of the embodiments of the invention, reference will now be made to the accompanying drawings in which.

DETAILED DESCRIPTION

The present disclosure relates to a downhole ball valve that includes a ball that includes one or more portions that are dissolvable. In the event that the ball valve becomes stuck or otherwise unable to establish fluid communication in a flow path, the ball can be partially dissolved and partially milled away or entirely dissolved in order to establish fluid communication.

Figure 1:
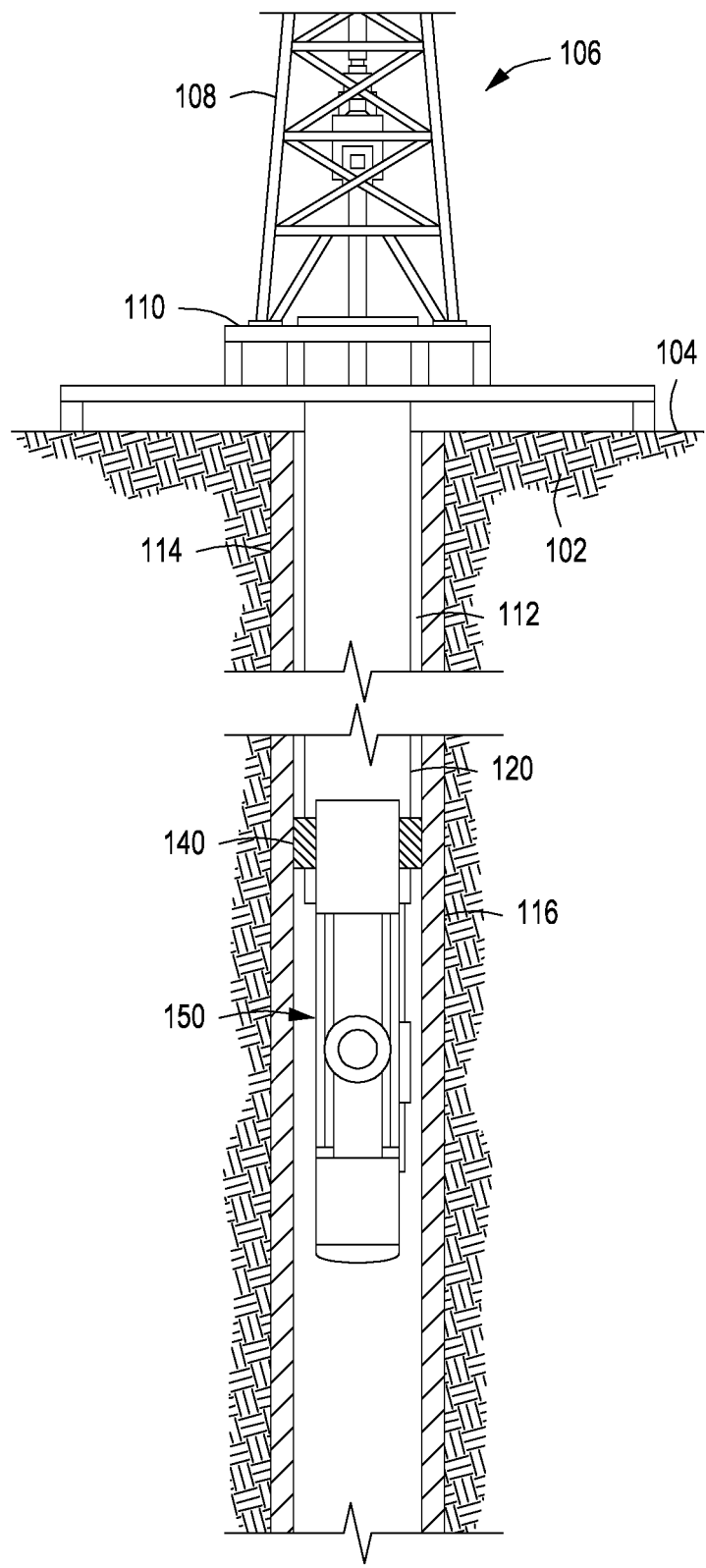
FIG. 1 depicts an example well system that includes a downhole ball valve, in accordance with example embodiments of the present disclosure.

FIG. 1 depicts an example well system 100 that includes a downhole ball valve 150. As depicted, the operating environment comprises a workover and/or drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The illustrated wellbore 114 extends substantially vertically away from the earth's surface 104 over a vertical wellbore portion 116 and an annulus 112 is defined between the wellbore 114 and the tubing string 120 (and other downhole tools in the wellbore 114). In alternative operating environments, all or portions of the wellbore 114 may be vertical, deviated at any suitable angle, horizontal, and/or curved. The wellbore 114 may be a new wellbore, an existing wellbore, a straight wellbore, an extended reach wellbore, a sidetracked wellbore, a multi-lateral wellbore, and other types of wellbores for drilling and completing one or more production zones. Further the wellbore 114 may be used for both producing wells and injection wells, and may be completely cased, partially cased, or open hole (e.g., uncased).

A wellbore tubular string 120 that includes the ball valve 150 may be lowered into the subterranean formation 102 for a variety of purposes (e.g., injecting or producing fluids from the wellbore, workover or treatment procedures, etc.) throughout the life of the wellbore 114. The implementation shown in FIG. 1 illustrates the wellbore tubular 120 in the form of a production tubing string that includes a packer 140 disposed in the wellbore 114. The wellbore tubular 120 that includes the ball valve 150 is equally applicable to any type of wellbore tubular being inserted into a wellbore as part of a procedure needing fluid isolation from above or below the ball valve, including as non-limiting examples drill pipe, segmented pipe, casing, rod strings, and coiled tubing. Further, techniques of isolating the interior of the wellbore tubular string 120 from the annular region between the wellbore tubular string 120 and the wellbore wall 114 may take various forms. For example, a zonal isolation device such as a packer (e.g., packer 140), may be used to isolate the interior of the wellbore tubular string 120 from the annular region to allow for the ball valve 150 to control the flow of a fluid through the wellbore tubular 120. In some implementations, the wellbore tubular string 120 that includes the ball valve 150 may be used without any additional zonal isolation device (e.g., a packer).

In some embodiments, the workover and/or drilling rig 106 may comprise a derrick 108 with a rig floor 110 through which the wellbore tubular 120 extends downward from the drilling rig 106 into the wellbore 114. The workover and/or drilling rig 106 may comprise a motor driven winch and other associated equipment for extending the wellbore tubular 120 into the wellbore 114 to position the wellbore tubular 120 at a selected depth. While the operating environment depicted in FIG. 1 refers to a stationary workover and/or drilling rig 106 for conveying the wellbore tubular 120 comprising the ball valve 150 within a land-based wellbore 114, in alternative implementations, mobile workover rigs, wellbore servicing units (such as coiled tubing units), and the like may be used to lower the wellbore tubular 120 comprising the ball valve 150 into the wellbore 114. The wellbore tubular 120 comprising the ball valve 150 may alternatively be used in other operational environments, such as within an offshore wellbore operational environment.

Regardless of the type of operational environment in which the ball valve 150 is used, the ball valve 150 comprises a flow through device that serves to control a flow of fluid from the surface to a formation (and vice-versa) through a tubular or conduit, including situations in which the ball valve 150 fails to actuate (e.g., fails to open or be adjusted from a closed position).

The ball valve 150 may also comprise components (e.g., a threaded connection) located above or below the ball valve 150 to allow the ball valve 150 to be disposed within and/or coupled to a wellbore tubular and/or other wellbore components (e.g., production subs, downhole tools, screens, etc.), for example, to form a workstring, production string, conveyance string, etc. While the following discussion describes a wellbore tubular 120 with a ball valve 150, it should be understood that any plurality of ball valves 150 comprising the flow through device may be used in one or more wellbore tubular 120 strings to achieve the results and advantages described herein.

Figure 2:
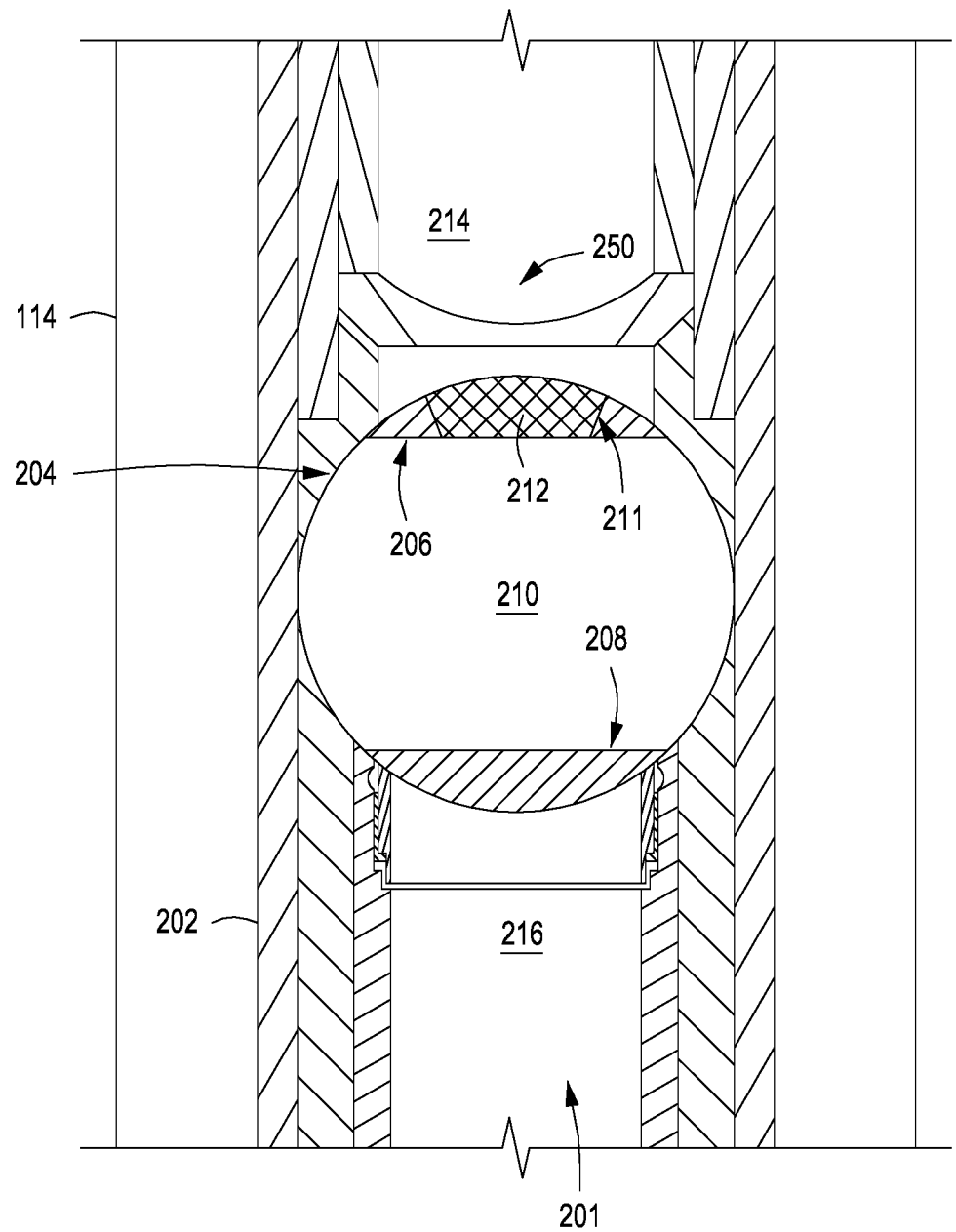
FIG. 2 depicts a cross-section view of an example ball valve, in accordance with example embodiments of the present disclosure.

FIG. 2 depicts a cross-section view of a portion of an example ball valve 250, which, in some aspects, may be used as the ball valve 150 in the system 100. FIG. 2 illustrates the valve 250 within the wellbore 114, and in a closed position. In one or more embodiments, the ball valve 250 includes a housing 202, such as a tubular housing, that may be coupled (e.g., threadingly) to other downhole components, in a downhole string or otherwise, that are uphole and/or downhole of the valve 250. The housing 202 includes a flow path formed therein. In the illustrated implementation, the housing 202 is a single piece tubular component or multi-piece component that encloses other components of the valve 250 therein.

The ball valve 250 further includes a ball 204 which includes a bore 210 formed therethrough. When the ball valve 250 is in the closed position, the bore 210 is turned orthogonal to the flow path 201 of the valve 250. In an open position (not shown), the bore 210 of the ball 204 may be turned to align (e.g., completely, substantially, or partially) with the flow path 201 to allow fluid communication through the valve 250. In one or more embodiments, the ball 204 is positioned in the flow path 201 such as to divide the flow path 201 into a first portion 214 and a second portion 216. Over the course of an operation, the first and second portions may have the same pressure or a pressure differential. The two portions of the flow path 201 can also be considered an uphole portion 214 and a downhole portion 216.

The ball 204 may also have a top side 206 and a bottom side 208, in which the top side 206 faces the uphole portion 214 of the flow path 20 land the bottom side 208 faces the downhole portion 216 of the flow path 201 when the valve 250 is in the closed position. In certain applications, higher pressure may be applied onto the bottom side 208 of the ball 204 than onto the top side 206 of the ball 204. Typically, in such embodiments, the downhole portion of the flow path 201 is the portion to be sealed (e.g., to prevent upward flow of reservoir fluid). Thus, the bottom side 208 of the ball 204 can be configured to provide adequate sealing and requires adequate structural strength. The top side 206 of the ball 204 may be subject to lesser load and therefore may have less structural strength than otherwise if subjected to greater load. As such, a portion of the top side 206 can be filled with, contain, or otherwise include one or more dissolvable materials.

In one or more embodiments, the ball 204 is made of a material based on, for example, pressure requirements to seal the valve 250 against flow in the closed position. The ball 204 of the valve 250 may also include a portion or portions that are made of a different material that is dissolvable. Such dissolvable portions may be dissolved if the valve fails and the need to establish fluid communication by intervention arises. The ball 204 may also include a non-dissolvable portion fabricated from a material capable of providing structural support and withstanding high pressure at the valve 250. Thus, when intervention is required to establish fluid communication through the valve 250, the dissolvable portion of the ball 204 is dissolved away and a hole is milled or otherwise formed in the non-dissolvable portion. In some applications, the ball 204 is oriented such that at least some of the non-dissolvable portion is subject to the higher pressures of the wellbore 114. Thus, the ball 204 can effectively prevent fluids from escaping the wellbore 114.

As shown in FIG. 2, the top side 206 of the ball 204, adjacent the bore 210, includes a hole 211 that is formed (e.g., bored, milled, or otherwise formed) within the ball 204. In some aspects, the hole 211 may extend from the outer surface of the top side 206 through to the bore 210, thereby putting the low pressure portion of the flow path in fluid communication with the bore 210. In alternative aspects, the hole 211 may extend from the outer surface of the top side 206 toward the bore 210, but may not reach the bore 210.

In one or more embodiments, the hole 211 is filled with a dissolvable material 212, and is different from a base material from which the ball 204 is formed. The dissolvable material 212 may be in solid form or fluid form when applied to the ball 204. In the embodiment of FIG. 2, the bottom side 208 of the ball 204 may be made of the base material, and a portion of the top side 206, such as the portion that surrounds the hole 211, is made of the base material. The dissolvable material may be relatively and/or significantly easier to dissolve than the base material. For example, the dissolvable material may be dissolvable by a solvent that would not dissolve the base material.

In one or more embodiments, the dissolvable material use to fill the ball 204 may be dissolvable when acted upon by a dissolving agent. The dissolving agent may be provided to the ball 204 from the surface via the flow path 201. The dissolvable materials can be or include, but are not limited to, magnesium, aluminum, gallium, alloys thereof, or any mixture thereof. In some examples, the dissolvable material can be or include one or more magnesium alloys and/or one or more aluminum alloys. The dissolving agents can be or include, but are not limited to, one or more acids, one or more bromides, one or more chlorides, or any mixture thereof. For example, the dissolving agent can be or include calcium bromide, hydrochloric acid, brine (e.g., sodium chloride and/or other salts in water), or any mixture thereof. Specifically, in one example, completion fluid that contains calcium bromide may be used in an operation, and the dissolvable material in the ball 204 may include a magnesium alloy, which is readily reactive with and dissolvable by calcium bromide.

The non-dissolvable base material used to fabricate the ball 204 may include a hard, structurally strong material such as a metal, metal alloy, plastic, a composite material, among others. Non-limiting examples of the base material can be or include non-corrosive steel, one or more INCONEL® alloys, one or more nickel-chromium alloys, one or more stainless steels, alloys thereof, or any mixture thereof. In some embodiments, the entire ball 204 may be fabricated from a dissolvable material.

Figure 3:
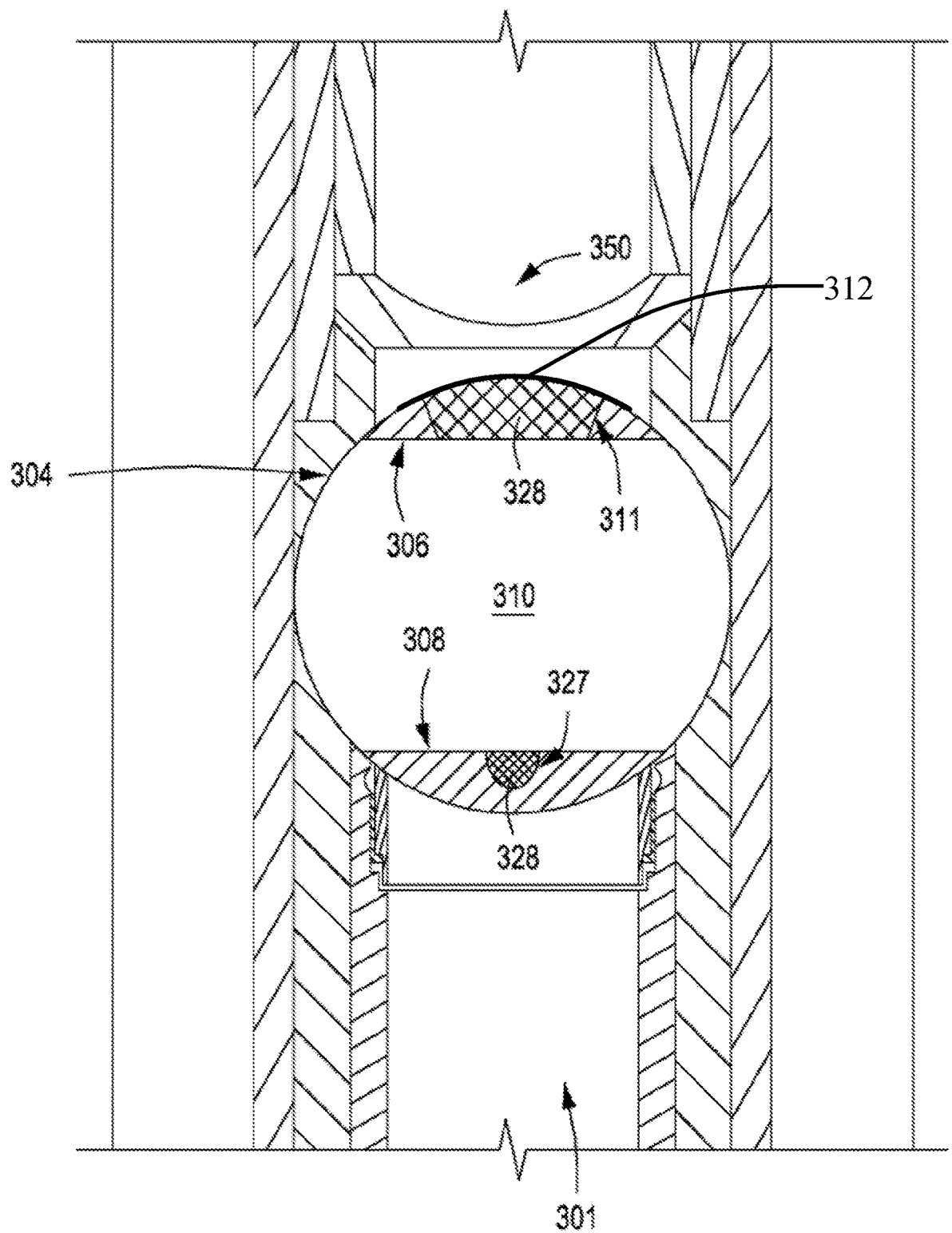
FIG. 3 depicts a cross-section view of another example ball valve, in accordance with example embodiments of the present disclosure.

FIG. 3 depicts a cross-section view of another example of a downhole ball valve 350. In the embodiment of the valve 350 shown in FIG. 3, a bottom side 308 of the ball 304 includes a cavity 327 formed therein. Similar to a hole 311 formed in top side 306, the cavity 327 may also be filled with a dissolvable material 328.

In the illustrated implementation of FIG. 3, the cavity 327 is shaped to approximate a cone, pyramid, or the like. The illustrated cavity 327 extends from the bore 310 towards the outer surface of bottom side 308 of the ball 304. As shown, however, the cavity 327 does not extend to meet the outer surface of the bottom side 308 of the ball 304, thereby leaving at least a layer of the base material between the bore 310 and the flow path 301. In one or more embodiments, the cavity 327 may extend through to the downhole portion of the flow path 301.

As illustrated in FIG. 3, the portions of the ball 304 that are filled with the dissolvable material (e.g., hole 311 and cavity 327) are arranged so as to provide a relatively centralized fluid path through the ball 304 (orthogonal to the bore 310) once the dissolvable material is dissolved. Thus, in embodiments in which some base material still remains between the centralized fluid path and the high pressure portion of the flow path 301, a hole can be more easily formed therethrough as there is significantly less material to mill or otherwise remove.

The present disclosure also provides a method of establishing flow through a ball valve. Typically, such techniques are used when the ball valve is unable to open or establish flow through normal operation, and intervention is required. The method includes introducing a dissolving agent to a ball of the ball valve, in which the ball comprises at least a dissolvable portion. The dissolving agent can be introduced to the ball by injection downhole and dissolves away the dissolvable portion(s) of the ball substantially either substantially instantly or over a period of time. In some embodiments, when the dissolvable portion(s) of the ball are dissolved away, a layer of non-dissolvable base material remains and separates the uphole portion of the flow path from the downhole portion of the flow path. In such embodiments, the method includes forming a hole though said remaining base material, thus establishing flow through the ball valve. In one or more embodiments, the hole may be formed by a milling operation.

In one or more embodiments, the ball can include dissolvable material all the way through such that when the dissolvable material is dissolved, a hole is left in the ball which provides flow through the ball valve even though the ball remains in the closed position. In such embodiments, no other hole needs to be formed or milled.

In another embodiment, the ball includes a metal or non-dissolvable skin 312 covering the dissolvable material. Thus, when intervention is required, the non-dissolvable skin 312 is punctured or at least partially removed to exposed the dissolvable material. The dissolvable material can then be dissolved as described above.

The present disclosure further provides a method of fabricating ball valves 150, 250, 350 (FIGS. 1-3), as well as other ball valves. According to one or more embodiments, the method includes obtaining or fabricating a ball made of a base material such as that described above. A hole is then formed in at least a portion of the ball. The cavity may extend from a region of the surface of the ball into the ball. In some embodiments, the cavity ends within the ball and does not extend completely through the ball. In one or more embodiments, the cavity extends through the ball, forming a path from one surface region to another surface region.

The method further includes filling the cavity with a dissolvable material such as that described above. The dissolvable material may be sintered, subjected to a cryogenic process, or another curing process in order to be integrated into the ball and solidified. The method further includes forming a bore through the ball. In some embodiments, the bore is formed after the dissolvable material is integrated into the ball. In some other embodiments, the bore is formed before the dissolvable material is integrated into the ball. In some embodiments, the bore is generally orthogonal to the direction of the cavity containing the dissolvable material.

Various implementations of the ball valve according to the present disclosure may include none, one or some of the following features. For example, the ball valve may reduce rig and/or work time in the case of a "fail closed" situation where the valve may need to be milled (e.g., bored, cut, or otherwise milled) through to achieve fluid communication therethrough. As another example, the ball valve may be able to withstand design wellbore pressures while also allowing mill through capability in the case of a fail closed situation. In another example, the ball valve may facilitate a centralizing of a mill through when milling (or boring or cutting or dissolving) through particular portions of the ball.

In addition to the embodiments described above, embodiments of the present disclosure further relate to one or more of the following paragraphs:

1. A ball valve, comprising: a housing comprising a flow path; and a ball positioned in the flow path and configured to seal a first portion of the flow path from a second portion of the flow path in a closed position, the ball comprising a bore formed therethrough, and at least a portion of the ball being dissolvable.

2. A ball valve, comprising: a housing comprising a flow path; and a ball positioned in the flow path and configured to seal a first portion of the flow path from a second portion of the flow path in a closed position, the ball comprising a bore formed therethrough, and the ball comprises a dissolvable portion and a non-dissolvable portion.

3. A ball valve, comprising: a housing comprising a flow path; and a ball positioned in the flow path and configured to seal a first portion of the flow path from a second portion of the flow path in a closed position, the ball comprising a bore formed therethrough, and the ball comprises a dissolvable portion and a non-dissolvable portion, wherein the dissolvable portion comprises magnesium, aluminum, gallium, alloys thereof, or any mixture thereof, and wherein the non-dissolvable portion comprises a non-corrosive steel, a nickel-chromium alloy, a stainless steel, alloys thereof, or any mixture thereof.

4. The ball valve of any one of paragraphs 1-3, wherein the dissolvable portion is in a solid state and dissolvable when acted upon by a dissolving agent.

5. The ball valve of paragraph 4, wherein the dissolvable portion comprises magnesium, aluminum, gallium, alloys thereof, or any mixture thereof.

6. The ball valve of paragraph 4, wherein the dissolving agent comprises an acid, a bromide, a chloride, or any mixture thereof.

7. The ball valve of any one of paragraphs 1-6, wherein the ball comprises the dissolvable portion and a non-dissolvable portion.

8. The ball valve of paragraph 7, wherein the non-dissolvable portion comprises a non-corrosive steel, a nickel-chromium alloy, a stainless steel, alloys thereof, or any mixture thereof.

9. The ball valve of paragraph 7, wherein the non-dissolvable portion of the ball is positioned adjacent to a relatively high pressure side of the flow path, and configured to seal the relatively high pressure side of the flow path.

10. The ball valve of any one of paragraphs 1-9, wherein the entire ball is dissolvable when acted upon by a dissolving agent.

11. The ball valve of any one of paragraphs 1-10, wherein the dissolvable portion of the ball is positioned adjacent to a relatively low pressure side of flow path.

12. The ball valve of any one of paragraphs 1-11, wherein the ball is rotatable between the closed position and an opening position in which the bore is in fluid communication with the uphole portion of the flow path and the downhole portion of the flow path.

13. A method of establishing flow through the ball valve according to any one of paragraphs 1-12.

14. A method of fabricating the ball valve according to any one of paragraphs 1-12.

15. A method of establishing flow through a ball valve, comprising: introducing a dissolving agent to a ball of the ball valve; dissolving at least a portion of the ball; and establishing a flow path through the dissolved portion of the ball valve.

16. The ball valve or method of any one of paragraphs 1-15, further comprising forming a hole in a non-dissolved portion of the ball.

17. The method of paragraph 16, further comprising forming the hole in a non-dissolved portion of the ball via a milling operation.

18. The ball valve or method of any one of paragraphs 1-17, further comprising forming a hole in or at least partially removing a non-dissolvable skin covering a dissolvable portion of the ball.

19. The ball valve or method of any one of paragraphs 1-18, further comprising introducing the dissolving agent after failure of the ball valve to move from a closed position to an open position.

20. A method of fabricating a ball valve, comprising: forming a cavity at least partially through a ball; filling the cavity with a dissolvable material; and forming a bore through the ball.

21. The ball valve or method of any one of paragraphs 1-20, further comprising fabricating the ball from a base material more resistant to dissolving than the dissolvable material.

22. The ball valve or method of any one of paragraphs 1-21, further comprising integrating the dissolvable material within the ball.

23. The method of paragraph 22, wherein integrating the dissolvable material within the ball includes at least one of sintering the dissolvable material in place, subjecting the dissolvable material to a cryogenics process, or curing the dissolvable material.

24. The ball valve or method of any one of paragraphs 1-23, further comprising: forming a hole through the ball, wherein the hole extends from one surface region of the ball to another surface region of the ball; and filling the hole with the dissolvable material.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A ball valve, comprising:
a housing comprising a flow path; and
a ball positioned in the flow path and configured to seal a first portion of the flow path from a second portion of the flow path in a closed position, the ball comprising a dissolvable portion, a non-dissolvable portion, and bore formed therethrough, the dissolvable portion positioned adjacent to a relatively low pressure side of the flow path when the ball valve is closed and the non-dissolvable portion positioned adjacent to a relatively high pressure side of the flow path when the ball valve is closed; and
a non-dissolvable skin covering the dissolvable portion of the ball valve, wherein the non-dissolvable skin is configured to be punctured prior to dissolving the dissolvable portion of the ball valve.

2. The ball valve of claim 1, wherein the dissolvable portion is in a solid state and dissolvable when acted upon by a dissolving agent.

3. The ball valve of claim 2, wherein the dissolvable portion comprises magnesium, aluminum, gallium, alloys thereof, or any mixture thereof.

4. The ball valve of claim 2, wherein the dissolving agent comprises an acid, a bromide, a chloride, or any mixture thereof.

5. The ball valve of claim 1, wherein the non-dissolvable portion comprises a non-corrosive steel, a nickel-chromium alloy, a stainless steel, alloys thereof, or any mixture thereof.

6. A method of establishing flow through a ball valve, comprising:
puncturing a non-dissolvable skin covering a dissolvable portion of a ball of the ball valve, wherein the dissolvable portion is positioned adjacent to a relatively low pressure side of a flow path through the ball valve when the ball valve is closed and a non-dissolvable portion positioned adjacent to a relatively high pressure side of the flow path when the ball valve is closed;
introducing a dissolving agent to the ball of the ball valve;
dissolving the dissolvable portion of the ball; and
establishing a flow path through the dissolved portion of the ball valve.

7. The method of claim 6, further comprising forming a hole in a non-dissolved portion of the ball.

8. The method of claim 7, further comprising forming the hole in a non-dissolved portion of the ball via a milling operation.

9. The method of claim 6, further comprising introducing the dissolving agent after failure of the ball valve to move from a closed position to an open position.

10. A method of fabricating a ball valve, comprising:
forming a cavity through a portion of a non-dissolvable ball to be positioned adjacent to a relatively low pressure side of a flow path through the ball valve when the ball valve is closed;
filling the cavity with a dissolvable material;
covering the dissolvable material with a non-dissolvable skin that is configured to be punctured prior to dissolving the dissolvable material; and
forming a bore through the ball.

11. The method of claim 10, further comprising integrating the dissolvable material within the ball.

12. The method of claim 11, wherein integrating the dissolvable material within the ball includes at least one of sintering the dissolvable material in place, subjecting the dissolvable material to a cryogenics process, or curing the dissolvable material.

\* \* \* \* \*